United States Patent
Donahue et al.

(10) Patent No.: US 6,399,231 B1
(45) Date of Patent: Jun. 4, 2002

(54) METHOD AND APPARATUS FOR REGENERATING THE PERFORMANCE OF A PEM FUEL CELL

(75) Inventors: John Donahue, Sufield; Thomas F. Fuller, Glastonbury; Deliang Yang, Vernon; Jung S. Yi, Mansfield, all of CT (US)

(73) Assignee: UTC Fuel Cells, LLC, South Windsor, CT (US)

( * ) Notice: Subject to any disclaimer, the term of this patent is extended or adjusted under 35 U.S.C. 154(b) by 110 days.

(21) Appl. No.: 09/602,361

(22) Filed: Jun. 22, 2000

(51) Int. Cl.[7] ................................................. H01M 8/04
(52) U.S. Cl. ........................... 429/13; 429/12; 429/19; 204/101; 204/129
(58) Field of Search .............................. 429/12, 13, 19; 204/101, 129

(56) References Cited

U.S. PATENT DOCUMENTS

| | | | |
|---|---|---|---|
| 3,990,912 A | * 11/1976 | Katz | 429/14 |
| 4,294,892 A | 10/1981 | Alfenaar | 429/13 |
| 5,320,718 A | * 6/1994 | Molter et al. | 205/555 |
| 5,503,944 A | 4/1996 | Meyer et al. | 429/13 |
| 6,007,931 A | 12/1999 | Fuller et al. | 429/13 |
| 6,020,083 A | 2/2000 | Breault et al. | 429/36 |
| 6,024,848 A | 2/2000 | Dufner et al. | 204/252 |
| 2001/0044040 A1 | 11/2001 | Uribe et al. | 429/13 |

FOREIGN PATENT DOCUMENTS

| | | | | |
|---|---|---|---|---|
| JP | S63-26961 | 2/1988 | | H01M/8/04 |
| JP | H08-24050 | 3/1996 | | |
| WO | WO 99/34465 | 7/1999 | | H01M/8/04 |
| WO | WO 01/01508 A1 | 1/2001 | | H01M/8/04 |

* cited by examiner

Primary Examiner—Carol Chaney
Assistant Examiner—Dah-Wei Yuan

(57) ABSTRACT

PEM fuel cell performance losses caused by phenomena occurring during normal cell operation are recovered by periodically reducing the cathode potential to about 0.6 volts or less, and preferably to 0.1 volt or less. Once the cathode potential is reduced to the desired low level, it is maintained at or below that level for a period of time. The lower the potential to which the cathode is brought, the more quickly regeneration will occur. After regeneration, the cell, when returned to normal operation, will operate at a higher performance level.

9 Claims, 2 Drawing Sheets

METHOD AND APPARATUS FOR REGENERATING THE PERFORMANCE OF A PEM FUEL CELL

BACKGROUND OF THE INVENTION

1. Technical Field

This invention relates to regenerating the performance of fuel cells that use proton exchange membranes (PEM) as the electrolyte.

2. Background Information

It is well known that fuel cells of all types experience performance losses or decay during the course of their operation. Performance loss is a degradation in the voltage of the cell at a fixed current density or, conversely, a degradation of current density at a fixed voltage. Such performance losses may be the result of a variety of factors, including operating environment, component design, operating and maintenance procedures, and the kinds of materials used. Any means or method for reducing such losses must consider the impact on other important aspects of cell design, cell performance and cell operation. For applications such as powering automobiles, high performance levels and the means for attaining and retaining it must be viewed in conjunction with expectations for fuel cell life, low cost and ease of maintenance, all of which are critical for commercial success.

PEM (proton exchange membrane) cells are currently being developed by both large and small companies for automotive applications, and for that reason the identification, understanding and resolution of PEM cell performance decay has become very important. An example of a PEM fuel cell is described in commonly owned U.S. Pat. No. 6,024,848 to Dufner et al, incorporated herein by reference.

BRIEF SUMMARY OF THE INVENTION

The present invention regenerates a PEM fuel cell, which degrades in performance during normal operation, by periodically operating the cell in a manner to cause the cathode potential to drop below normal operating levels. The invention is equally applicable to cells using pressurized and unpressurized reactants.

According to one embodiment of the present invention, PEM fuel cell performance losses caused by phenomena occurring during normal cell operation are recovered by periodically reducing the cathode potential to about 0.6 volts or less, and preferably to 0.1 volt or less. Once the cathode potential is reduced to the desired low level, it is maintained at or below that level for a short period of time. The lower the potential to which the cathode is brought, the more quickly regeneration will occur. After regeneration the cell, when returned to normal operation, will operate at a higher performance level. The regeneration is preferably done periodically to maintain high cell performance levels.

During testing of PEM cells that use platinum or platinum alloy catalyst, unacceptable performance losses were observed over time. The evidence suggests the losses are attributable to performance deterioration occurring during cell current production under normal operating conditions, which means conditions wherein the cathode potential is above about 0.66 volt. It was discovered that reducing the cathode potential to below 0.66 volt for a short period of time regenerates the cells to the point wherein they are again able to operate under normal cell operating conditions at significantly higher performance levels then prior to the regeneration procedure. Surprisingly, all or essentially all the performance losses that occur during periods of normal operation can be recovered by operating the cell briefly at a low cathode potential. Thus, the performance level of the cell may be maintained at a high level for an extended period of time.

In the specification and claims the phrase "normal cell operation" means that the cell is operating at a cathode potential of at least 0.66 volt with a hydrogen containing fuel on the anode and an oxidant on the cathode to provide an electric current within an external electric circuit to power an electricity using device. (Note: Cathode potential equals cell voltage, plus anode potential, plus the product of cell current and PEM resistance. Thus, cathode potential is always slightly higher than cell voltage.)

The more frequent the periodic regeneration (e.g. the less the amount of time the cell operates under normal operating conditions between successive regenerations), the higher will be the average performance level of the cell over the course of normal operation. The preferred frequency of regeneration will depend upon the construction and operation of the cell, as well as its application. For some cells hourly or daily regeneration may be desirable. For others it may be best to regenerate the cell weekly or upon the occurrence of some event (such as during routine maintenance), or whenever performance of the cell under normal operating conditions falls below a pre-selected level. In an automotive application regeneration might automatically be performed each time the car is started, although such frequent regeneration is not likely to be required.

Although it is by no means certain, it is believed that the cell decay which this invention is intended to periodically reverse is the result of cathode platinum catalyst being converted to platinum oxides during normal cell operation. Platinum oxides do not have as high a catalytic activity for oxygen reduction as does platinum.

Consequently, there is a drop in cell performance over time. There is evidence that the conversion of platinum to platinum oxides occurs slowly, building to undesirable levels over the course of hundreds of hours of cell operation. It is believed that operating the cell at cathode potentials below about 0.6 volt in accordance with the teachings of the present invention results in the platinum oxides being reduced (i.e. the pure platinum returns), thereby improving the cell performance when normal cell operation resumes. The conversion of the platinum oxides back to platinum using the teachings of the present invention occurs at a much faster rate than the build up of platinum oxides.

One specific method for accomplishing the foregoing regeneration of the PEM fuel cell is to stop the flow of oxidant to the cell and disconnect the electric load. The cell is then connected to a power supply; and a hydrogen containing gas (preferably the same fuel as provided to the anode, such as essentially pure hydrogen) is flowed through the cell across both the anode and cathode. This forces any remaining oxidant from the cell and results in reducing the cathode potential. Once the desired low cathode potential of 0.6 volt or less (preferably 0.1 volt or less) is reached, the cathode potential is maintained at or below that low voltage for a sufficient period of time to cause the cell to revert to a condition wherein, when normal operation of the cell resumes, the cell has recovered a major portion of, and preferably all the performance it lost while operating normally. We refer to the forgoing method as the "hydrogen pumping" method since hydrogen ions are "pumped" from the cathode to the anode through the PEM during the regeneration process.

Another method for practicing the present invention is to disconnect the electrical load from the stack; flow hydrogen on the anode; and flow an inert gas, such as nitrogen, on the cathode. Hydrogen will diffuse across the PEM to the cathode (due to the hydrogen concentration difference on opposite sides of the porous membrane) and cause the cathode potential to drop. Once the cathode potential falls to a preselected low value of no greater than 0.6 volt, and preferably no greater than 0.1 volt, the cell is maintained at or below the preselected value for a sufficient period of time to cause the cell to revert to a condition wherein, upon resuming normal cell operation, the cell operates at a performance level significantly higher than its performance level immediately prior to the regeneration procedure, and preferably to the performance level of the cell immediately subsequent to the most previous regeneration. In this manner the cell retains high level of performance over an extended period of time.

Yet another technique for reducing the cathode potential to accomplish the purposes of the present invention is as follows: disconnect the cell from its normal operating load; halt the flow of oxidant to the cathode; continue the flow of hydrogen containing fuel to the anode; and connect the cell to an auxiliary external resistive load. When the flow of oxidant to the cell is stopped, some residual oxidant will remain within or be accessible to the oxidant flow field within the cathode. This oxidant is quickly consumed by the electrochemical reaction at the cathode as the current flows through the auxiliary external resistive load, thereby causing a reduction in the cathode potential. As in the previously described embodiments, once a desired low cathode potential is reached, the potential is held at or below that level for a period of time sufficient to restore cell performance to earlier higher levels.

In another embodiment, after a period of normal cell operation the electric load is removed from the cell and both the anode and cathode are supplied with a flow of hydrogen containing fuel, such as essentially pure hydrogen. In this open circuit mode with hydrogen on both electrodes, the cathode potential will be quickly reduced to below 0.1 volt. As in the previously described embodiments, once the cathode potential reaches a preselected low level it is maintained at or below that level for a period of time sufficient to regenerate the cell. The cell is then reconnected to the load and may resume normal operation.

Another method for regenerating a cell in accordance with the present invention is to intentionally periodically operate the cell at a cathode potential at or below about 0.64 volt without taking the cell off-line (i.e. without disconnecting the cell from its primary load) and without operating the anode and cathode on anything but their usual fuel and oxidant. For that reason this method has certain advantages over previously described embodiments. Two techniques that may be used in this embodiment are to operate the cell for a short period of time at a high current density, or to briefly operate the cell at high oxidant utilization. Both of these techniques result in a lowering of the cathode potential, and both are more fully described below. The foregoing features and advantages of the present invention will become more apparent in light of the following detailed description of exemplary embodiments thereof as illustrated in the accompanying drawings.

DETAILED DESCRIPTION OF THE INVENTION

Figure 1:
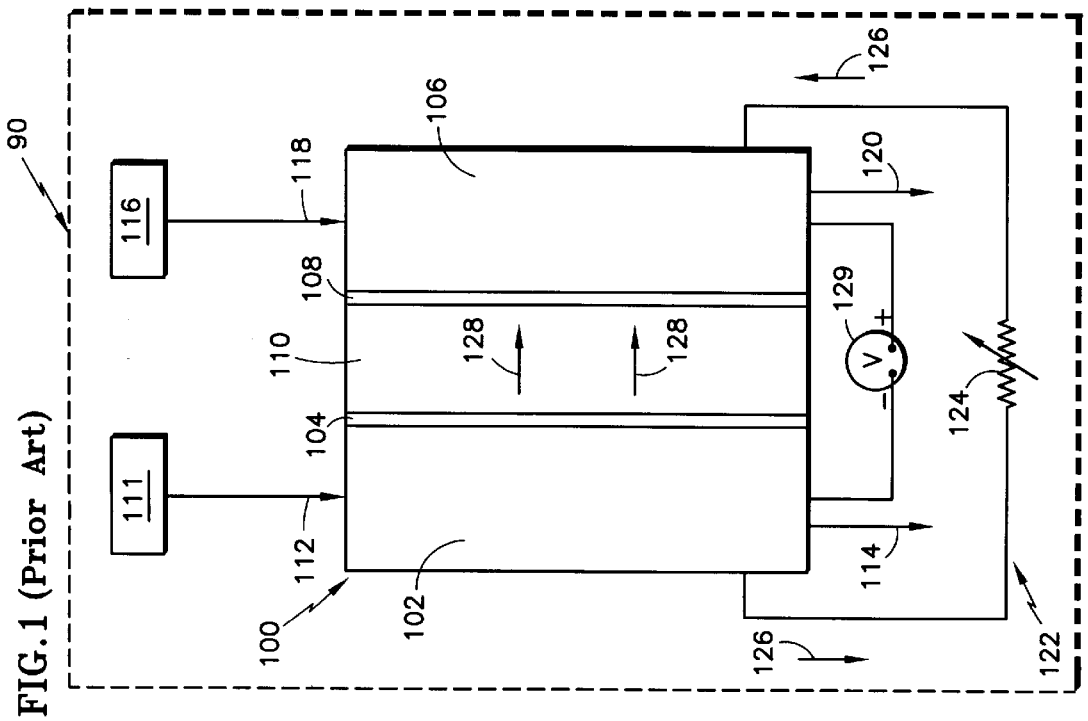
FIG. 1 is a schematic depiction of a PEM fuel cell operating in conventional fashion in accordance with the prior art.

In FIG. 1, which is not to scale, a fuel cell system 90 is shown comprising a PEM fuel cell is referred to by the reference numeral 100 and comprises an anode 102 including an anode catalyst layer 104,a cathode 106 including a cathode catalyst layer 108,and a PEM electrolyte 110 disposed between the anode and cathode. The combination of the anode catalyst layer, the PEM electrolyte, and the cathode catalyst layer are referred to as a membrane electrode assembly (hereinafter, MEA). Furthermore, although only a single cell is shown, in actuality a fuel cell would comprise a plurality of adjacent cells connected electrically in series. For purposes of simplicity, other parts of the cell or a stack of cells, such as coolant layers, reactant flow channels, or other features of the anode and cathode for carrying fuel and oxidant to the catalyst layers and for allowing the proper movement of water throughout the cell are also not shown, as their construction and operation are well known in the art and not a part of the present invention. Additionally, the fuel cell system would include controls, not shown, for controlling and monitoring the system, such as for controlling the rates of reactant flow as determined by the requirements of the load.

As shown in FIG. 1, fuel, such as hydrogen, from a source 111 is provided to the anode 102 via the conduit 112. Depleted fuel leaves the anode via the conduit 114. An oxidant, such as air, from a source 116 is provided to the cathode via a conduit 118 and leaves the anode via a conduit 120. The fuel electrochemically reacts in a well-known manner during normal cell operation to produce protons (hydrogen ions) and electrons. The electrons flow from the anode 102 to the cathode 106 through an external circuit 122 to power an electricity-using device represented by the load or resistance 124. The arrows 126 show the direction of electron flow. The electrons react with the oxidant and the protons at the cathode 106 to form water and heat. The hydrogen ions travel through the PEM 110 from the anode 102 to the cathode 106, dragging with them water molecules in the form of hydronium ions. The arrows 128 represent the flow of hydrogen and hydronium ions from the anode to the cathode.

When a cell is operating efficiently to produce current for an electricity-using device, the voltmeter 129,connected across the cell, will measure a high cell voltage. Most cells are designed to operate at a cell voltage above about 0.6 volt, and preferably operate between 0.7 and 0.8 volts the majority of the time. Operation at voltages lower than about 0.6 volt is considered inefficient and is avoided during normal cell operation.

We have found that during cell operation above about 0.6 volt there is an unacceptable deterioration of cell performance over and above and more rapid than the well known gradual performance degradation resulting from loss of catalyst surface area. One exemplary method for minimizing that unacceptable deterioration will now be described with reference to the fuel cell system of FIG. 2. This is accomplished by a method for periodically regenerating the cell frequently enough to avoid having the cell operate at undesirably low performance levels for an extended period of time,.

Figure 2:
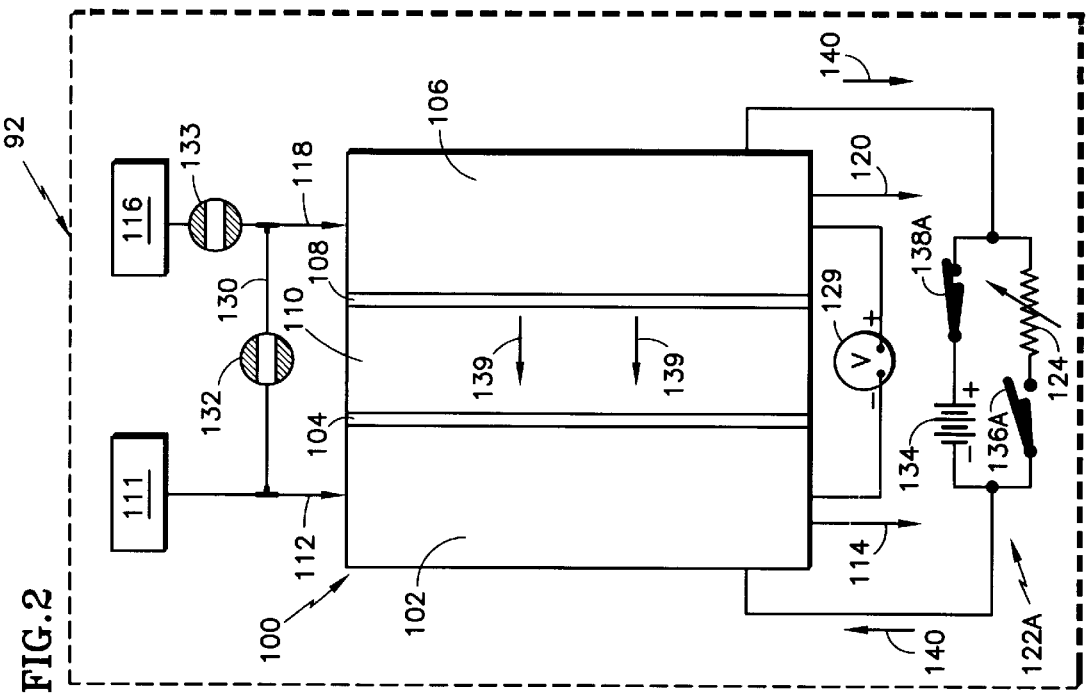
FIG. 2 is a schematic depiction of a PEM fuel cell system that may be operated conventionally and regenerated in accordance with one embodiment of the present invention.

Referring to the fuel cell system of FIG. 2, reference numerals which are the same as those used in FIG. 1 represent the same components. In the fuel cell system 92 a conduit 130 connects the fuel conduit 112 and the oxidant conduit 118. A valve 132 (shown open) is located within the conduit 130; and a valve 133 (shown closed) is located within the conduit 118 upstream of where the conduit 130 joins the conduit 118. The external circuit 122A connecting the anode and cathode includes a power supply such as a battery 134 disposed in parallel to the electric load 124. A switch 136A (shown open) is disposed in series with the electric load 124, and a switch 138A (shown closed) is disposed in series with the battery 134. The system 92 also includes controls, not shown, for operating the valves and switches either upon demand, in accordance with a schedule, or, for example, when certain measured parameters reach preselected values. During normal operation of the cell to provide electricity for the load 124, the valve 133 and switch 138 are open, and the valve 132 and the switch 136 are closed. In that mode the cell operates exactly as shown in FIG. 1.

In accordance with the present invention, after a period of operation in the normal operating mode, the cell is operated for a short period of time in the regeneration mode of FIG. 2 for the purpose of driving the cathode potential down to below 0.66 volts, and preferably to below 0.5 volt. Most preferably it is driven to below 0.1 volt. Faster regeneration occurs at lower cathode potentials.

More specifically, in the regeneration mode of FIG. 2 the valve 133 is closed, the valve 132 is open, the switch 136A is open, and the switch 138A is closed. In this mode of operation the flow of fresh oxidant to the cell is cut off and hydrogen flows to the cathode as well as the anode. Hydrogen ions and electrons are produced at the cathode. These electrons, and electrons produced by the battery 134, flow to the anode within the circuit 122A, as depicted by the arrows 140. Hydrogen ions and hydronium ions flow across the PEM to the anode, as depicted by the arrows 139. The hydrogen ions combine with the electrons to produce hydrogen at the anode. As this process proceeds the cell voltage and the cathode potential are rapidly reduced. After a short period of time the cell is returned to its normal operating mode with oxidant being provided to the cathode.

What has been found is that cell performance measured immediately after operating the cell in the regeneration mode is higher than cell performance measured immediately preceding operation of the cell in the regeneration mode. It has been demonstrated that all, or essentially all, of the performance loss experienced by the cell as a result of normal operation may be recovered by reducing the cathode potential to less than 0.66 volt, and then operating the cell for a sufficient period of time at or below that low cathode potential. Essentially the entire cell performance loss may be recovered by the appropriate selection of a low cathode potential and the amount of time the cathode is held at or below that selected potential.

A workable combination of low cathode potential and the amount of time at that low potential may be readily determined by experimentation. The combination finally selected would likely take into consideration other factors such as convenience, cost, and application requirements.

Periodic regeneration at appropriate intervals in accordance with the teachings of the present invention can prevent the performance of a cell from dropping below a pre-selected value. This may be done by scheduling the regeneration mode of operation to occur at sufficiently close intervals; or the performance of the cell could be monitored, and regeneration triggered shortly after the cell performance falls to a pre-selected value during normal operation.

In one particular series of tests, a non-pressurized stack of 20 PEM fuel cells having the generic design of the fuel cell described in hereinabove referred to U. S. Pat. No. 6, 024, 848 was operated alternately between the normal operating mode of FIG. 1 and the regeneration mode of FIG. 2. The cells of that stack included a membrane electrode assembly (MEA) comprising a mil thick perfluorosulfonic ionomer membrane having platinum containing anode catalyst disposed on one side thereof and a platinum containing cathode catalyst disposed on the other side thereof. More specifically, the anode had a platinum-ruthenium alloy catalyst loading of 0.6 mg/cm$^2$, and the cathode had a platinum catalyst loading of 0.4 mg/cm$^2$. This assembly was supplied by the W. L. Gore Company of Ekton, Md. under the trade name PRIMEA 5560.

During normal operation the 20-cell stack was operated at a hydrogen utilization of approximately 80% and an oxygen utilization of approximately 30% on air. Reactant pressures were approximately 14.7 psia and cell temperature was approximately 120° F. (It should be noted that a number of different matters were being investigated during the testing of this cell stack. Some of those matters necessitated that certain steps be taken which are not required by the method of the present invention. These are pointed out as the test procedure is described. Additionally, in this test and in the other tests described in this specification, the anode potential is equivalent to a standard hydrogen electrode at the same temperature. All stated potentials are relative to a standard hydrogen electrode.)

Near the end of a period of 580 hours of normal operation in the mode of FIG. 1 at cell voltages between 0.63 volt and 0.76 volt, cell performance measurements were taken at various current densities, including at 100 and at 500 ASF (amps per square foot). The electrical load was then removed from the cell stack and the reactant flow fields were purged with nitrogen. Hydrogen gas was passed through both the anode and cathode flow fields and the cell stack was connected to a power supply as per FIG. 2. (In this embodiment of the invention it is not required that the anode fuel flow field or the cathode oxidant flow field be purged with nitrogen or other inert gas. When the hydrogen is passed through the cathode oxidant flow field it automatically purges the oxidant from that flow field.) The hydrogen flow rate was equivalent to 80% utilization at 750 ASF. The cathode potential quickly dropped to approximately 0.0 volts. The current density was increased from 100 ASF to 700 ASF in increments of 100 ASF. Each current density from 100 to 600 ASF was held for minutes. The current density at 700 ASF was held for minutes. The cell voltage increased linearly from 0.0 volts to 0.058 volts as the current density was increased from 0 ASF to 700 ASF. The current density was then reduced to 0.0 ASF in 100 ASF increments, holding each new current density for approximately 1.5 minutes. During this entire procedure the cathode potential remained constant at about 0.0 volts. This completed the regeneration cycle.

The flow of hydrogen was halted and both reactant flow fields were again purged with nitrogen. The anode was then purged with hydrogen and the cathode was purged with air. (The purging of hydrogen from the anode fuel flow field prior to returning to normal operation is not a requirement of the present invention. On the other hand, it may be desirable, although not required, to purge the cathode oxidant flow field of hydrogen using an inert gas prior to returning to normal cell operation because of safety or cell durability concerns.)

After the foregoing regeneration procedure, normal cell operation was resumed, and performance of the cell was measured again at 100 ASF and 500 ASF immediately after start-up. The entire procedure was repeated after another 570 hours, for a total of approximately 1050 hours of normal cell operation. The results are displayed in Table 1, below.

TABLE 1

| Length of Normal Cell Operation (cumulative hours) | Current Density (ASF) | Cathode Potential at 700 ASF during Regeneration (volts) | Cell Performance Immediately Before Regeneration (volts/cell) | Cell Performance Upon Start-up, After Regeneration (volts/cell) |
|---|---|---|---|---|
| 580 | 100 | 0.00 | 0.763 | 0.789 |
| 580 | 500 | 0.00 | 0.633 | 0.710 |
| 1050 | 100 | 0.00 | 0.745 | 0.801 |
| 1050 | 500 | 0.00 | 0.615 | 0.702 |

It is readily apparent from Table 1 that the regeneration procedure of the present invention significantly improved the performance of the cells, returning them to significantly higher performance levels than existed immediately prior to each regeneration cycle. More specifically, in this series of tests essentially all of the cell performance losses that occurred during normal operation prior to each regeneration procedure were recovered as a result of each regeneration procedure. Also, although in these tests the cathode potential was held at approximately 0.00 volts for more than one hour during the course of the regeneration procedure, it is believed that similar results would have been obtained by holding low cathode potentials for much shorter periods of time, perhaps five minutes or less, as was demonstrated in experiments using other embodiments of the present invention described below. Further, it is believed that similar results would have been obtained if the polarity of the power supply in FIG. 2 were reversed. With the polarity reversed from that shown in the drawing, the protons would pass from the anode side of the cell to the cathode side. Hydrogen gas would be consumed on the anode and would be evolved on the cathode. If sufficient hydrogen is evolved on the cathode, it may not be necessary to divert hydrogen from the source 111 to the cathode.

In another variation on the embodiment described with respect to FIG. 2, the same regenerative procedure may be used, except that, after the primary load 124 is disconnected, the circuit 122A is allowed to remain open (i.e. switches 136A and 138A both remain open). With hydrogen on both sides of the cell the cathode potential would still fall to the desired low level; however, it may take longer to do so, and it may be required to hold the cathode potential at the low voltage for a longer period of time (as compared to the FIG. 2 embodiment) in order to accomplish the same improvement in cell performance.

Figure 3:
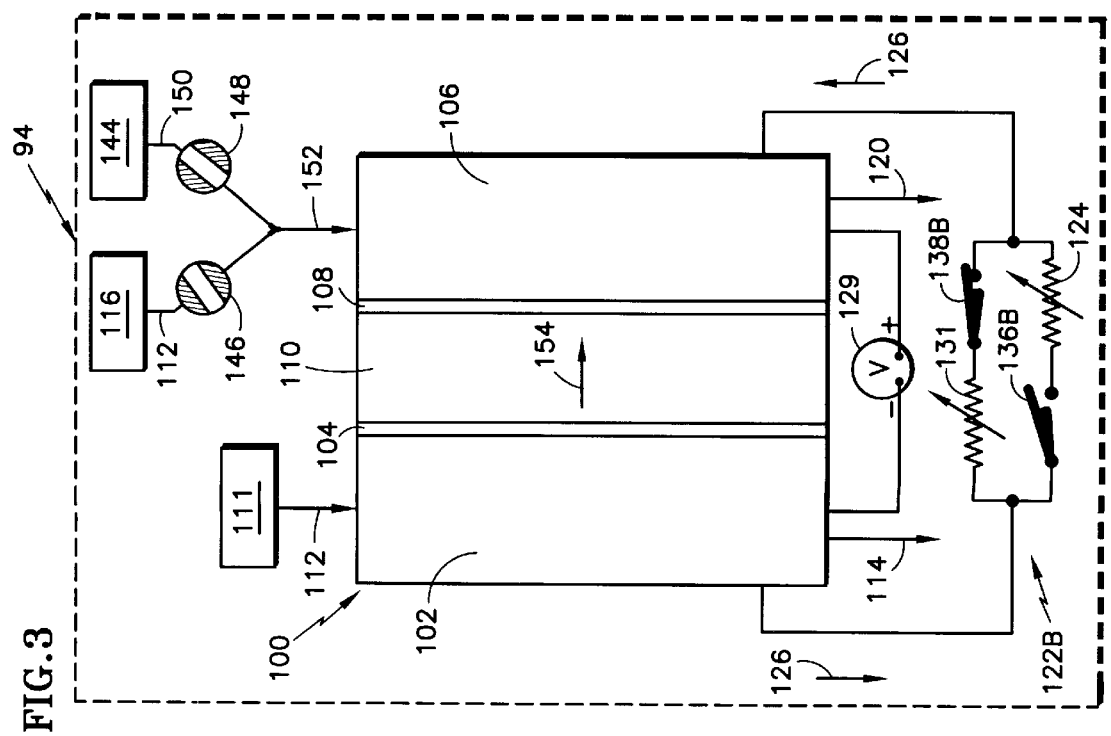
FIG. 3 is a schematic depiction of a PEM fuel cell system that may be operated conventionally and regenerated in accordance with an alternate embodiment of the present invention.

Regeneration of the cell in accordance with another embodiment of the present invention is depicted schematically in FIG. 3, wherein the fuel cell system is designated by the reference numeral 94. In the system of FIG. 3, in addition to the air source 116, an inert gas source 144 is provided. Valves 146, 148 in conduits 112, 150, respectively, control whether air from the source 116 or inert gas from the source 144 flows to the cathode 106 via the conduit 152. The external circuit 122B connecting the anode and cathode includes a switch 136B in series with the primary load 124. A small auxiliary external resistive load 131 is disposed in parallel to the electric load 124. A switch 138B is disposed in series with the auxiliary resistive load 131.

Initially the valve 146 is open, the valve 148 closed, the switch 136B closed, and the switch 138B open, such that the cell operates in a normal manner identical to the cell arrangement shown in FIG. 1. After a period of normal cell operation the cell may be operated in one of two regeneration modes. The preferred mode is the arrangement shown in FIG. 3, wherein the valve 146 is closed, the valve 148 is open, the switch 136B is open and the switch 138B is closed. During that mode the hydrogen continues to flow on the anode, but the cathode receives inert gas from the source 144, which purges the air from the cathode flow field. (Although an inert gas, such as nitrogen or argon, is preferred, any gas that doesn't react at a significant rate at the fuel cell cathode may be used. Examples include carbon dioxide, methane, natural gas, propane, or butane.) Hydrogen diffuses from the anode to the cathode through the porous PEM (as represented by the arrow 154) as a result of the difference in hydrogen concentration on opposite sides of the PEM. A small current flows from the anode to the cathode through the auxiliary resistive load 131 within the external circuit 122B, as represented by the arrows 126. The combination of hydrogen diffusion and the flow of current through the auxiliary resistive load drive down the cathode potential.

In an alternative regeneration mode both switches 136B and 138B are open (i.e. an open circuit regeneration mode). Regeneration occurs because the cathode potential will still drop due to the hydrogen diffusion, but at a somewhat slower rate than with the auxiliary resistive load connected.

The results of a test using the open circuit regeneration mode with nitrogen on the cathode are shown in Table 2. The test vehicle was a non-pressurized stack of 20 PEM cells of the same construction as described in the previous examples. First the cells were run normally (valve 146 open, valve 148 closed, switch 142 closed) for a period of time using conditions similar to the conditions used for normal operation in the previous examples. The stack was then switched to the regeneration mode. Cell voltage was reduced to less than 0.1 volt approximately two minutes after the electrical load was removed and the nitrogen flow began. The hold times shown in the Table 2 are the periods of time the cell voltages were held at below 0.1 volt. Nitrogen continued to flow during the hold times. The last two columns of Table 2 show cell performance immediately before regeneration and immediately after restarting normal operation of the cells. Measurements were taken at two different current densities for each cycle. The procedure was repeated after another 660 hours of normal operation using a different hold time.

TABLE 2

| Length of Normal Cell Operation (cumulative hours) | Hold Time @ Less Than 0.100 Volts/cell (minutes) | Current Density (ASF) | Cell Performance Immediately Before Regeneration (volts/cell) | Cell Performance Upon Start-up, After Regeneration (volts/cell) |
|---|---|---|---|---|
| 710 | 5 | 100 | 0.779 | 0.800 |
| 710 | 5 | 500 | 0.673 | 0.693 |
| 1370 | 15 | 100 | 0.790 | 0.799 |
| 1370 | 15 | 500 | 0.658 | 0.690 |

The recovery of performance with either a 5-minute or 15 minute hold time is clear from Table 2. Since this procedure has not been optimized, even shorter hold times may be acceptable. In this embodiment, as with other embodiments of the present invention, it is expected that the less time the cell operates normally before a regeneration cycle, and the lower the cathode potential during the regeneration cycle, the shorter will be the required period of time needed at the low potential in order to recover cell performance.

Figure 4:
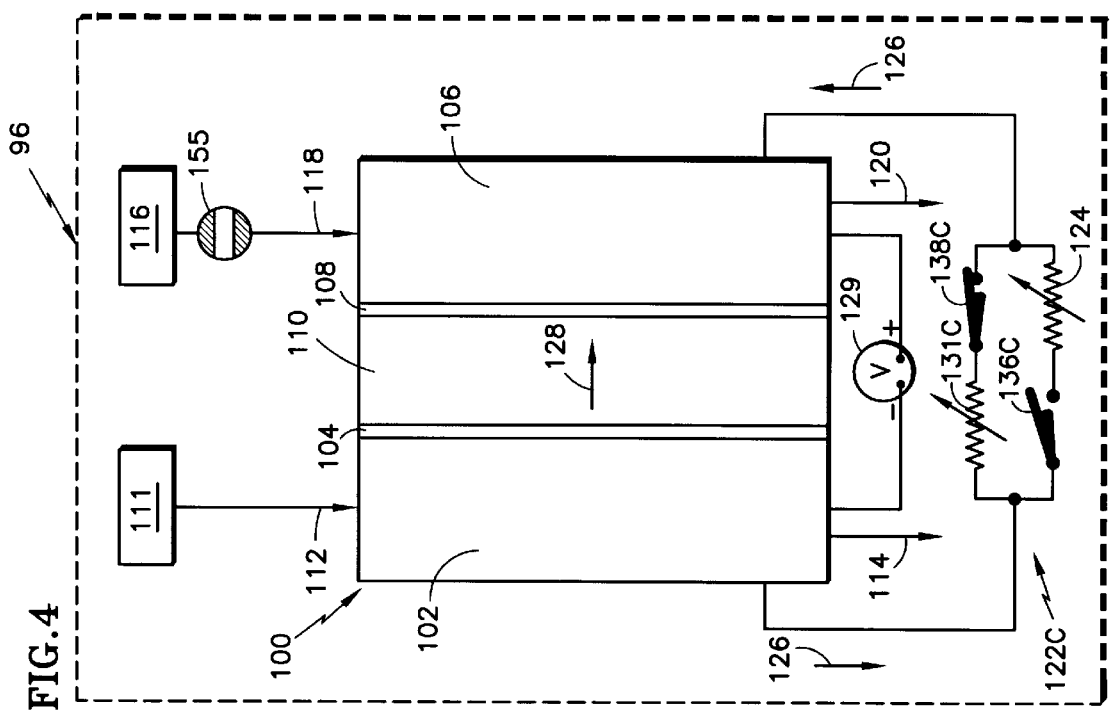
FIG. 4 is a schematic depiction of a PEM fuel cell system that may be operated conventionally and regenerated in accordance with yet another embodiment of the present invention.

FIG. 4 schematically shows apparatus for operating and regenerating a cell according to yet another embodiment of the present invention. Like the fuel cell system of FIG. 1, the fuel cell system 96 includes a source 111 of hydrogen containing fuel, and a source 116 of oxidant, such as air. A valve 155 is disposed in the oxidant feed conduit 118. The circuit 122C includes the fuel cell normal (i.e. primary) load 124, as well as a small auxiliary external resistive load 131C in parallel with the load 124. Switches 136C and 138C are disposed within the circuit 122C to allow the cell 100 to be connected to the normal load 124 or the auxiliary resistive load 131C. During normal cell operation the valve 155 is open; the switch 136C is closed; and the switch 138C is open. In that configuration the cell operates in the manner described with respect to FIG. 1.

After a period of normal operation the cell is regenerated by setting the valves and switches as shown in FIG. 4. More specifically, the valve 155 is closed; the switch 136C is opened; and the switch 138C is closed. Thus, in the regeneration mode, the flow of oxidant to the cathode is shut off, while the flow of fuel to the anode continues. With no new oxidant flowing to the cathode, the small amount of oxidant trapped within the flow field is consumed, quickly driving the cathode potential down to a low value. The cell is returned to its normal operating configuration after the cathode potential has remained below a selected low value for a brief period of time sufficient to regenerate the cell.

Table 3 shows the results of testing the regeneration procedure depicted by the arrangement of FIG. 4 on a non-pressurized stack of 20 PEM cells of the same construction as described in the previous examples.

Hydrogen was the fuel and air was the oxidant. The cells were run normally (valve 155 open, switch 136C closed, switch 138C open) for 350 hours and then switched to the regeneration mode of FIG. 4 as follows: The primary load 124 was removed from the stack and the auxiliary resistive load put in its place by opening the switch 136C and closing the switch 138C. Oxidant flow to the cathode was interrupted by closing the valve 155; and hydrogen continued to flow to the anode. From the time the oxidant flow was interrupted it took about 15 minutes for the cathode potential to drop to below 0.1 volt. The auxiliary load remained connected so as to hold the cathode potential below 0.1 volt for two minutes. The dummy load was then removed and the cathode flow field purged with air. (Purging of the cathode flow field with air prior to returning the cell to normal operation is not a required step in the regeneration procedure of this embodiment.) The stack was then returned to normal operation providing electricity for the primary load 124.

Cell performance immediately before regeneration and immediately after restarting normal operation of the cell was measured at two different current. The recovery of performance is clear from Table 3.

TABLE 3

| Length of Normal Cell Operation (cumulative hours) | Hold Time @ Less Than 0.100 Volts/cell (minutes) | Current Density (ASF) | Cell Performance Immediately Before Regeneration (volts/cell) | Cell Performance Upon Start-up, After Regeneration (volts/cell) |
|---|---|---|---|---|
| 350 | 2 | 100 | 0.781 | 0.794 |
| 350 | 2 | 600 | 0.679 | 0.688 |

Results from testing yet another embodiment of the present invention is displayed in Table 4. In those tests regeneration was accomplished by periodic excursions of a cell from relatively high normal operating cell voltages to relatively low cell voltages (and thus relatively low cathode potentials), without removing the primary load. This was done by periodically increasing the current. A non-pressurized 20-cell PEM stack like those used in the foregoing examples was also used in these tests.

At the beginning of each day of cell operation (after a period of shut down which has no impact on the test results as they relate to the present invention) the cell voltage at 250 ASF was measured (In Table 4, see column labeled 'Cell Voltage @ 250 ASF Before Excursion'). During each of the first four days of testing, after taking that initial measurement, a current density excursion was performed as follows: the cell was operated for minutes at each of 100 ASF, 250 ASF, 500 ASF, and 800 ASF, sequentially. The current density was then reduced in the same increments with each being held for minutes, for a total excursion time of 80 minutes.

Following each excursion the cell voltage was again measured at 250 ASF (see column labeled 'Cell Voltage @ 250 ASF After Excursion'). The cell was then operated normally for 6 hours and then shut down. During each of the next four days (days 5–8 in Table 4) the same procedure was used, except the maximum excursion current density was 500 ASF, and the total excursion time was 65 minutes.

The results displayed in Table 4 shows that the excursions over the first four days, which included short periods of time at cell voltages below 0.62 volt (corresponding to cathode potentials below about 0.68), resulted in an average voltage increase (before excursion compared to after excursion) of about 0.02 volt at 250 ASF. In comparison, excursions over days 5–8, which included cell voltages no lower than 0.66 volt (corresponding to cathode potentials of at least about 0.7 volt), resulted in an average voltage increase of only about 0.01 volt. Perhaps even more significantly, with reference to the last column of Table 4, the initial cell voltage at the beginning of each six hour run improved each day from an initial cell voltage of 0.745 volt on day one, to an initial cell voltage of 0.768 volt on day four. On the other hand, the cell voltage dropped from day to day during days 5 through 8 from 0.748 volt to 0.742 volt. This particular test demonstrates that the simple act of operating the cell on line, for short periods of time, at what would usually be considered ineficient, low voltages (and thus low cathode potentials) eliminates or at least reduces the cell decay which occurs during normal operation at high cathode potentials.

TABLE 4

| Day | Cell Voltage @ Max Current Density During Excursion (volts) | Cathode Potential @ Max Current Density (volts) | Max Current Density During Excursion (ASF) | Cell Voltage @ 250 ASF Before Excursion (volts) | Cell Voltage @ 250 ASF After Excursion (volts) |
|---|---|---|---|---|---|
| 1 | 0.551 | 0.615 | 800 | 0.724 | 0.745 |
| 2 | 0.592 | 0.656 | 800 | 0.739 | 0.760 |
| 3 | 0.613 | 0.677 | 800 | 0.749 | 0.764 |
| 4 | 0.615 | 0.679 | 800 | 0.750 | 0.768 |
| 5 | 0.683 | 0.723 | 500 | 0.744 | 0.748 |
| 6 | 0.672 | 0.712 | 500 | 0.736 | 0.746 |
| 7 | 0.666 | 0.705 | 500 | 0.731 | 0.743 |
| 8 | 0.668 | 0.708 | 500 | 0.733 | 0.742 |

Another method for reducing the cathode potential and recovering performance, without taking the cell off-line (i.e. without effectively shutting down the cell), is to periodically and briefly operate the cell at high oxidant utilization. Oxygen utilization is the percentage of a unit volume of oxygen entering a cell that is actually used by the cell as it passes therethrough. For example, air entering the cell is about 20% oxygen and 80% nitrogen (by volume). If half of the oxygen in the air is used during a pass through the cell, the oxidant utilization is 50%. The oxygen concentration in the depleted air will have decreased from 20% at the cathode oxidant inlet to 10% at the cathode oxidant outlet. As the average oxygen concentration over the cathode decreases, the cell voltage and the cathode potential decrease. Oxidant utilization can be easily increased by reducing the oxidant flow rate.

In a demonstration, using a 20-cell stack similar to those described in the foregoing examples, the stack was operated at a steady 1000 ASF using hydrogen at the anode and air at the cathode. Under normal operating conditions the hydrogen utilization is maintained at 80% and the oxygen utilization maintained at 40%. After a period of normal operation the oxygen utilization was increased to 70% for a brief period of time every ten minutes over the course of eight hours. Each brief oxygen utilization excursion from 40% to 70% and back to 40% took no more than about seconds, with the oxygen utilization staying at the 70% level for only a second or two. This procedure essentially produced a utilization 'spike' every ten minutes.

Immediately prior to each utilization spike the cell was operating at about 0.66 volt (equivalent to a cathode potential of about 0.74 volt). As the oxygen utilization spiked upwardly, the cell voltage spiked in the opposite direction, dropping quickly to about 0.60 volt (equivalent to a cathode potential of about 0.68 volt) at 70% utilization; but it just as quickly rebounded to about 0.67 volt as the utilization returned to 40%. Over the course of the next approximately 9.5 minutes before the next spike, the cell voltage gradually fell back from 0.67 to the aforementioned 0.66 volt. Thus, by using this procedure the average cell performance level did not deteriorate from cycle to cycle.

Although the invention has been described and illustrated with respect to the exemplary embodiments thereof, it should be understood by those skilled in the art that the foregoing and various other changes, omissions and additions may be made without departing from the spirit and scope of the invention.

What is claimed is:

1. A method of operating a fuel cell having a PEM as the electrolyte, an anode on one side of the PEM, a cathode on the other side of the PEM, an external electric circuit connecting the anode and cathode, and a primary electricity using device within the external circuit, comprising the steps of
   A. providing a hydrogen containing fuel to the anode and an oxygen containing oxidant to the cathode to generate, for a first period of time, an electric current within the external circuit for operating the primary electricity using device, the cell operating conditions being selected such that, during the course of said first period of time, the cathode potential is maintained above 0.66 volt and cell performance decreases;
   B. regenerating the cell after Step A by a) providing a hydrogen containing fuel to the anode while operating said cell using procedures selected to reduce the cathode potential to below 0.50 volt, said procedures including the steps of i) stopping the flow of oxidant to the cell, ii) disconnecting the primary electricity using device and replacing it with a battery in the external circuit, and iii) providing a flow of hydrogen containing gas to the cathode, and b) maintaining the cathode potential below the said 0.50 volt for a second period of time sufficient to essentially the cell performance decrease which occurred during the course of Step A; and,
   C. sequentially repeating Steps A and B to reduce the decrease in cell performance over time.

2. The method according to claim 1, wherein in Step B the cathode potential is maintained at 0.1 volt or less for said second period of time.

3. The method according to claim 2, wherein the said operating procedures in Step B which are selected to reduce the cathode potential includes increasing the current for said second period of time.

4. The method according to claim 1, wherein the said operating procedures of Step B which are selected to reduce the cathode potential include the steps of disconnecting the primary electricity using device from the external circuit and connecting an auxiliary resistive load in its place, stopping the flow of oxidant to the cell and allowing the oxidant remaining within the cell to be consumed at the cathode creating a current flow through the auxiliary resistive load within the external circuit, wherein each of Step B restores essentially the entire of the cell performance decrease which occurred during the immediately preceding step A.

5. The method according to claim 4, wherein in Step B said cell operating procedures are selected to reduce the cathode potential to 0.1 volt or less for said second period of time.

6. The method according to claim 1, wherein the said operating procedures in Step B which are selected to reduce the cathode potential includes increasing the oxidant utilization to at least 70% for said second period of time.

7. The method according to claim 1, wherein the said operating procedures in Step B which are selected to reduce the cathode potential includes increasing the current for said second period of time.

8. A method of operating a fuel cell having a PEM as the electrolyte, an anode on one side of the PEM, a cathode on the other side of the PEM, an external electric circuit connecting the anode and cathode, and a primary electricity using device within the external circuit, comprising the steps of
   A. providing a hydrogen containing fuel to the anode and an oxygen containing oxidant to the cathode to generate, for a first period of time, an electric current within the external circuit for operating the primary electricity using device, the cell operating conditions being selected such that, during the course of said first period of time, the cathode potential is maintained above 0.66 volt and cell performance decreases;

B. regenerating the cell after Step A by a) providing a hydrogen containing fuel to the anode while operating said cell using procedures selected to reduce the cathode potential to below 0.50 volt, said procedures including the steps of i) stopping the flow of oxidant to the cell and replacing it with a flow of inert gas, and ii) disconnecting the electricity using device from the circuit and leaving the circuit open until the cathode potential falls to below 0.5 volt, and b) maintaining the cathode potential below the said 0.50 volt for a second period of time sufficient to essentially restore the cell performance decrease which occurred during the course of Step A; and, C. sequentially repeating Steps A and B to reduce the decrease in cell performance over time.

9. The method according to claim 8, wherein in Step B the cathode potential is maintained at 0.1 volt or less for said second period of time.

* * * * *